(12) United States Patent
Weislogel et al.

(10) Patent No.: US 7,905,946 B1
(45) Date of Patent: Mar. 15, 2011

(54) SYSTEMS AND METHODS FOR SEPARATING A MULTIPHASE FLUID

(75) Inventors: Mark M. Weislogel, Tigard, OR (US); Evan A. Thomas, Boulder, CO (US); John C. Graf, Seabrook, TX (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 324 days.

(21) Appl. No.: 12/190,364

(22) Filed: Aug. 12, 2008

(51) Int. Cl.
*B01D 45/00* (2006.01)

(52) U.S. Cl. ............... 95/272; 55/447; 55/461; 55/465; 55/529; 55/428; 55/429; 55/DIG. 14; 95/271; 95/261; 96/208; 96/209; 96/216

(58) Field of Classification Search ............... 96/208, 96/209, 216; 95/272, 271, 261; 55/447, 55/461–465, 529, 459, 428, 429, DIG. 14
See application file for complete search history.

(56) References Cited

U.S. PATENT DOCUMENTS

| | | | | |
|---|---|---|---|---|
| 2,193,460 A * | 3/1940 | Lavigne | ........................... | 95/269 |
| 2,713,920 A * | 7/1955 | Phyl | ................................... | 96/56 |
| 2,998,100 A * | 8/1961 | Pike | ................................ | 55/458 |
| 3,077,714 A * | 2/1963 | McLivaine | ........................ | 96/311 |
| 3,528,217 A * | 9/1970 | Garrett | .............................. | 62/86 |
| 3,589,313 A * | 6/1971 | Smith et al. | ................... | 110/222 |
| 3,972,808 A * | 8/1976 | Manley | .......................... | 209/133 |
| 3,992,177 A * | 11/1976 | Welteroth | ........................ | 55/288 |
| 4,430,100 A * | 2/1984 | Cardo | .............................. | 55/344 |
| 5,004,552 A * | 4/1991 | Al-Yazdi | ........................ | 210/789 |
| 5,248,421 A * | 9/1993 | Robertson | .................. | 210/512.1 |
| 5,378,354 A * | 1/1995 | Poor | .............................. | 210/188 |
| 6,080,217 A * | 6/2000 | Gobl et al. | ...................... | 55/283 |
| 6,364,940 B1 | 4/2002 | Prueter et al. | | |
| 6,569,323 B1 * | 5/2003 | Pribytkov | ...................... | 210/181 |
| 6,925,680 B2 * | 8/2005 | Oh | ................................... | 15/350 |
| RE39,292 E | 9/2006 | Latos et al. | | |
| 7,125,711 B2 | 10/2006 | Pugia et al. | | |
| 7,314,559 B2 | 1/2008 | Hopper | | |
| 7,341,663 B2 | 3/2008 | Offeman et al. | | |
| 7,473,289 B2 * | 1/2009 | Oh et al. | .......................... | 55/318 |
| 7,547,351 B2 * | 6/2009 | Oh et al. | .......................... | 95/271 |
| 7,556,662 B2 * | 7/2009 | Lee et al. | ......................... | 55/345 |
| 7,594,944 B2 * | 9/2009 | Oh | ................................... | 55/345 |
| 7,637,973 B2 * | 12/2009 | Oh et al. | .......................... | 55/337 |
| 7,662,199 B2 * | 2/2010 | Wellens et al. | .................. | 55/337 |
| 7,678,166 B2 * | 3/2010 | Yoo et al. | ......................... | 55/345 |
| 7,736,422 B2 * | 6/2010 | Osborne | .......................... | 95/271 |

(Continued)

FOREIGN PATENT DOCUMENTS

JP            60137412 A  *  7/1985

*Primary Examiner* — Jason M Greene
*Assistant Examiner* — Dung Bui
(74) *Attorney, Agent, or Firm* — Theodore U. Ro

(57) ABSTRACT

Apparatus and methods for separating a fluid are provided. The apparatus can include a separator and a collector having an internal volume defined at least in part by one or more surfaces narrowing toward a bottom portion of the volume. The separator can include an exit port oriented toward the bottom portion of the volume. The internal volume can receive a fluid expelled from the separator into a flow path in the collector and the flow path can include at least two directional transitions within the collector.

28 Claims, 4 Drawing Sheets

U.S. PATENT DOCUMENTS

| | | |
|---|---|---|
| 2002/0144600 A1 | 10/2002 | TeGrotenhuis et al. |
| 2002/0194993 A1* | 12/2002 | Gen ................................ 95/268 |
| 2004/0099614 A1* | 5/2004 | Lehmann et al. ............. 210/787 |
| 2005/0000800 A1 | 1/2005 | Speranza et al. |
| 2005/0150827 A1* | 7/2005 | Hopper ...................... 210/512.1 |
| 2007/0079580 A1* | 4/2007 | Oh .................................. 55/345 |
| 2007/0199284 A1* | 8/2007 | Yoo et al. ........................ 55/345 |

\* cited by examiner

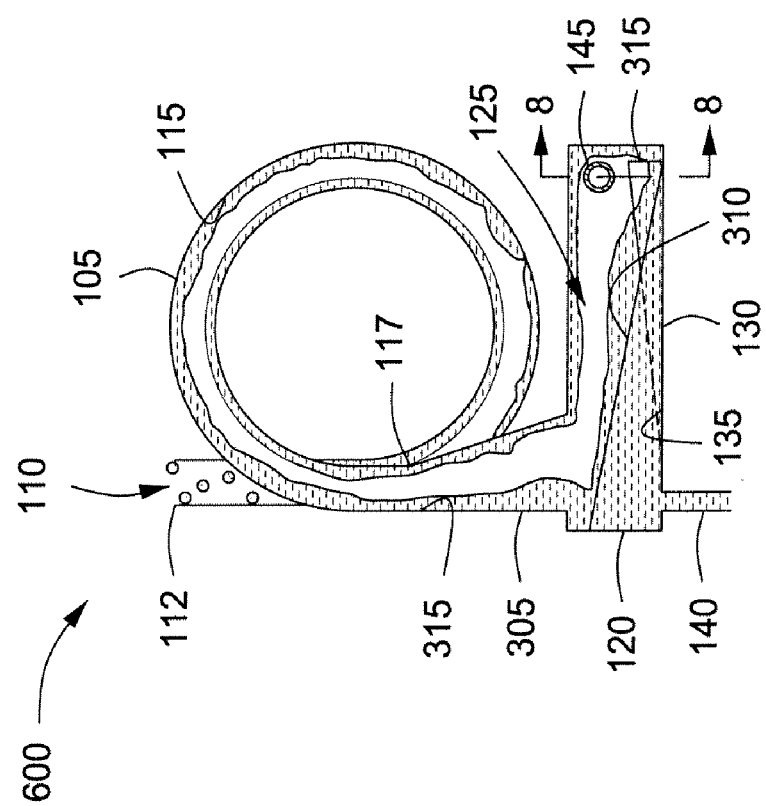
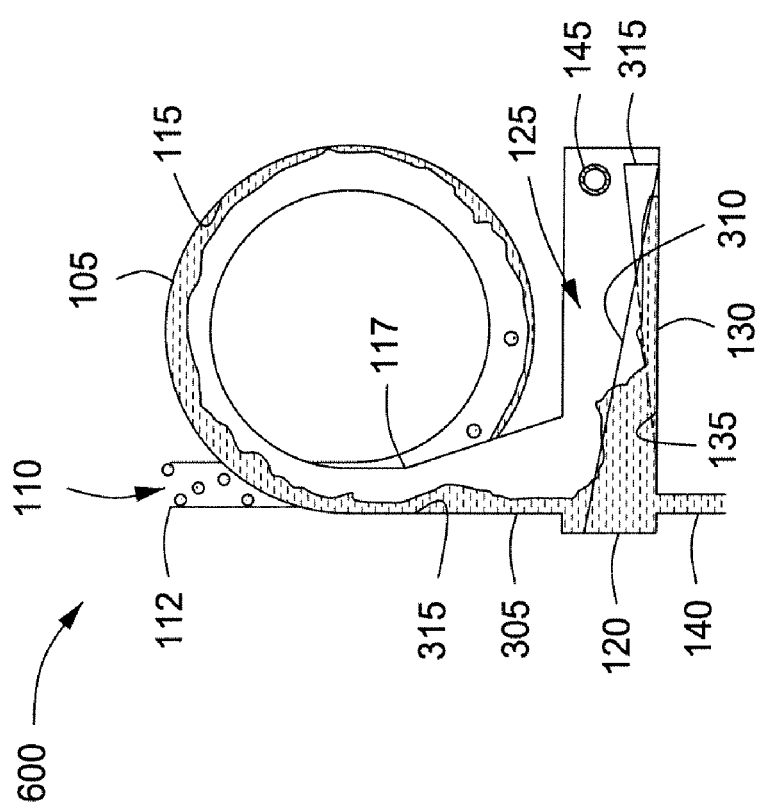

SYSTEMS AND METHODS FOR SEPARATING A MULTIPHASE FLUID

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

Embodiments of the present invention generally relate to apparatus and methods for the separation of a multiphase fluid. More particularly, embodiments of the present invention relate to apparatus and methods for the separation of gas and variably wetting liquids in a fluid flow.

2. Description of the Related Art

Typical fluid separators use gravity for natural separation of multiphase fluids. However, separating multiphase fluids in microgravity environments or where the multiphase fluid has variable wetting conditions is a complex process because rather than buoyancy effects controlling, surface tension and wetting forces dominate. The separation of variable wetting multi-phase fluids in microgravity require many engineering challenges that must be overcome if one is to successfully separate liquids from gases. Conventional systems for separating liquid from gas in a fluid in microgravity environments have used, among others, rotary separation, capillary separation, and absorbent separation techniques.

The current techniques for separating multi-phase fluids in microgravity require frequent maintenance; are prone to system failure due to precipitate and particulate contamination, biofouling, and slug flow; require large amounts of electrical power; and have wetted moving parts with close tolerances. An additional shortcoming of the current separation techniques based upon capillary separation is that only liquids with favorable wetting properties, e.g. generally perfectly wetting liquids having a contact angle $\theta \approx 0°$, can successfully be separated from a multiphase fluid containing, for example liquid and gas. Typical multiphase fluids contain liquids having varying wetting properties which cannot be separated using current capillary based systems. Examples of such liquids can be water, e.g. perspiration, cabin condensation, and water produced from fuel cells, urine, and other liquids.

There is a need, therefore, for a new apparatus and methods for separating liquid and gas in a fluid where the liquid has variable wetting properties having improved system reliability, reduced power consumption, and reduced system weight.

SUMMARY OF THE INVENTION

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

Apparatus and methods for separating a fluid are provided. An apparatus for separating a fluid can include a separator and a collector having an internal volume defined at least in part by one or more surfaces narrowing toward a bottom portion of the volume and the separator can include an exit port oriented toward the bottom portion of the volume.

Another apparatus for separating a fluid can include a separator and a collector having an internal volume that receives a fluid expelled from the separator into a flow path in the collector, the flow path having at least two directional transitions within the collector.

A method for separating a fluid can include introducing the fluid to a separator, at least partially separating the fluid into a gas and a liquid by flowing the fluid through the separator and expelling the separated fluid from the separator into a collector. The liquid can be manipulated within the collector at least in part by at least one of a momentum of the liquid, a capillary force, and a motive force of the gas.

Another aspect disclosed is a system for separating a fluid that includes a fluid introduction device, a multi-phase separator that includes a separator in fluid communication with the fluid introduction device and a collector having an internal volume defined at least in part by one or more surfaces narrowing toward a bottom portion of the volume. The separator can include an exit port oriented toward the internal volume. A gas collection system can be in fluid communication with a collector gas outlet and a liquid collection system can be in fluid communication with a collector liquid outlet.

BRIEF DESCRIPTION OF THE DRAWINGS

For a detailed understanding of the present disclosure, reference should be made to the following detailed description of the several non-limiting embodiments, taken in conjunction with the accompanying drawings, in which like elements have been given like numerals and wherein:

FIG. 6 depicts an operational view of an illustrative multi-phase separator according to one or more embodiments described;

FIG. 7 depicts another operational view of an illustrative multi-phase separator according to one or more embodiments described;

DETAILED DESCRIPTION

Figure 1:
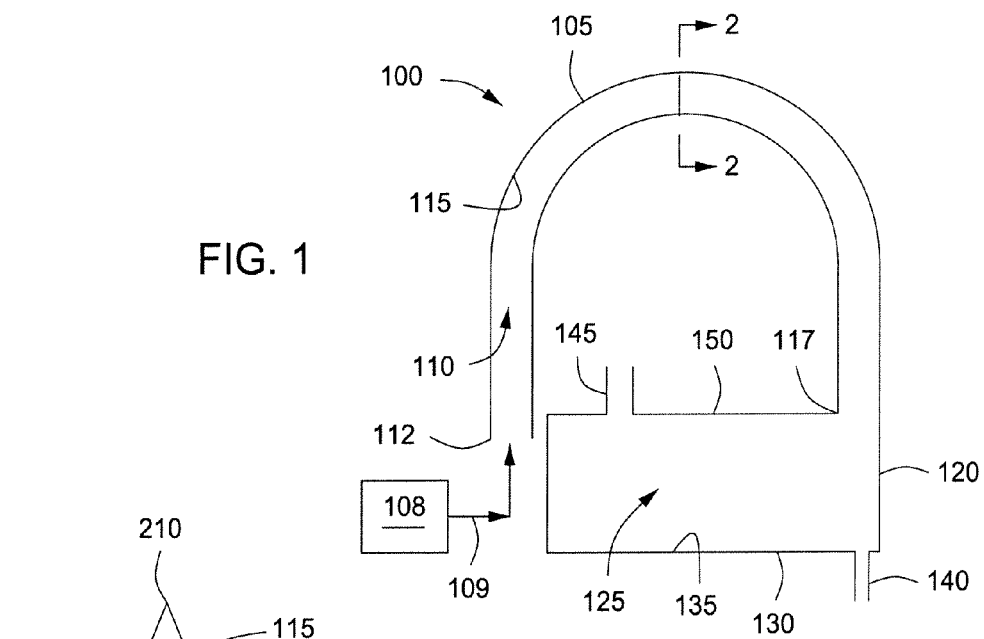
FIG. 1 depicts a schematic of an illustrative multi-phase separator according to one or more embodiments described.

FIG. 1 depicts a schematic of an illustrative multi-phase separator 100 according to one or more embodiments. In one or more embodiments, the multi-phase separator ("MPS") 100 can include, but is not limited to a separator 105 and a collector 120. In one or more embodiments, the separator 105 can include a passage 110 and one or more first grooves 115. In one or more embodiments, at least a portion of the passage 110 can be curved. The one or more first grooves 115 can be disposed about an outer diameter or outer edge of the passage 110 relative to a central axis of the passage 110. Similarly, at least a portion of the passage 110 can be straight, for example at a first end 112 of the passage 110 as illustrated in FIG. 1. In one or more embodiments, the passage 110 can be straight, curved, or can include one or more straight sections in combination with one or more curved sections. The collector 120 can include an internal volume 125. The internal volume 125 can be defined at least in part by one or more surfaces that narrow or converge toward a bottom portion 130 of the internal volume 125. The one or more surfaces narrowing toward the bottom portion 130 can form one or more second grooves 135 along at least a portion of the bottom portion 130 of the internal volume 125. The collector 120 can include one or more collector exit ports. For example, the collector 120 can include at least one first collector exit port shown in this example as a lower collector exit port 140 and at least one second collector exit port shown in this example as an upper collector exit port 145. As used herein, the terms "top," "bottom," "upper," "lower," "side," "left," "right," and other like terms refer to relative positions to one another and are not intended to denote a particular spatial orientation.

The passage 110 can provide a flow path from the first end 112 to a second end having a separator exit port 117. The first end 112 can be in fluid communication with an external fluid introduction device 108 via line 109. The fluid introduction device 108 can be any suitable system, device, or combination of systems and/or devices that can provide a multiphase mixture of one or more gases and one or more liquids requiring separation into a gas and a liquid. For example, the fluid introduction device 108 can be a waste management device. Other devices that can provide a fluid requiring separation can include, but are not limited to, fuel cells, fuel tanks, space vehicles, aircraft, for example cabin air to be dehumidified, and the like.

The separator exit port 117 can be in fluid communication with the internal volume 125 within the collector 120. In one or more embodiments, at least a portion of the length of the passage 110 can be a path curved about an axis such that the passage 110 includes a curved portion, for example along a radius of a helix. For simplicity and ease of description, embodiments of the path of the passage 110 will be further described in the context of a circular curve. However, the passage 110 can follow a linear path, a non-linear path or a combination of linear and non-linear paths. In addition to the circular and helical paths, other examples of non-linear paths may include an oval path, an elliptical path, a parabolic path, a spiral path, or any other suitable non-linear path. In other embodiments, the passage 110 can follow a planar or non-planar path, for example the curve as shown or a non-planar path, for example a helical path.

The curved portion of the passage 110 provides a flow path where heavier fluids can centrifugally flow along the outer perimeter of the passage 110 within the one or more first grooves 115. In addition to or in lieu of the centrifugal flow along the curved portion of the passage 110, capillary action can provide a motive force for heavier fluids. In addition to or in lieu of the centrifugal flow and/or the capillary action a flowing gas can provide a motive force for heavier fluids. Lighter fluids can flow along the inner perimeter of the passage 110 or in the case of a straight passage 110 along the side opposite the one or more first grooves 115. In one or more embodiments, the passage 110 can include a turn of about 90° or more about a central axis. For example, as shown in FIG. 1, the passage 110 includes a turn of about 180° about a central axis. Depending on the particular MPS 100 design parameters, the passage can include any suitable turning degree or number of turns. In one or more embodiments, the passage 110 can include a 360° turn about the central axis or more, in the case of a helically or spirally directed passage 110. For example, the passage 110 can include about a 450° turn, about a 540° turn, about a 630° turn, about a 720° turn, or more. The passage 110 can include, for example, a turn about the central axis ranging from a low of about 0.25 turns, about 0.5 turns, or about 1 turn to a high of about 2 turns, about 4 turns, or about 6 turns or more.

The inner diameter of the curved portion of the passage 110 can be any suitable diameter, which can be determined based upon the particular design parameters for the MPS 100. For example, the passage 110 can curve about a 7 cm inner diameter ("ID") coil or circle, about a 25 cm ID coil, about a 50 cm ID coil, about a 75 cm ID coil, or more. Further, in at least one embodiment, the passage can include a first section and a second section, where the first section includes a first cross-sectional area, and where the second section expands from the first cross-sectional area to a second cross-sectional area.

The first collector exit port 140 and the second collector exit port 145 can have any suitable cross-sectional shape and area. For example, the first and second collector exit ports 140, 145 can be circular, polygonal, or can include straight and curved sides. The cross-sectional area of the first and second collector exit ports 140, 145 can be the same or different. For example, the first collector exit port 140 can have a smaller cross-sectional area than the second collector exit port 145. Additionally, for example, the cross-sectional area of the first and second collector exit ports 140, 145 can range from a low of about 1 mm$^2$, about 3 mm$^2$, or about 5 mm$^2$ to a high of about 10 cm$^2$, about 100 cm$^2$, or about 1,000 cm$^2$.

Figure 2:
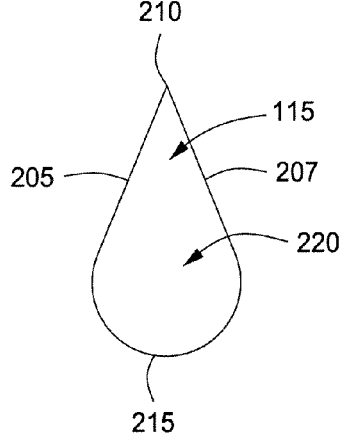
FIG. 2 depicts an illustrative cross-sectional view of a passage 110 depicted in FIG. 1 along line 2-2, according to one or more embodiments described.

FIG. 2 depicts an illustrative cross-sectional view of a passage 110 depicted in FIG. 1 along line 2-2, according to one or more embodiments. As shown, the first groove 115 can be defined by two sides or surfaces 205, 207 of the passage 110 that can intersect to form a corner 210. For simplicity and ease of description, embodiments of the cross-section of the passage 110 will be further described in the context of a cross-section that includes an intersection of two flat sides, however, any other suitable cross-section can be included in the passage 110. Other cross-sections can include, but are not limited to a parabola which can be defined at least in part by two sides curving together, a flat bottom which can be defined at least in part by two sides narrowing toward a flat surface, any other intersection of two or more surfaces, and the like. The passage 110 can also include one or more surfaces narrowing toward a bottom portion of the groove 115.

In one or more embodiments, the angle between the two sides 205, 207 can be any suitable angle. In one or more embodiments, the angle between the two sides 205, 207 can range from a low of about 5°, about 10°, about 15°, or about 20° to a high of about 50°, about 65°, about 75°, or about 90°. For example, the angle between the two sides 205, 207 can be about 30°, about 35°, about 40°, or about 45°. In one or more embodiments, the angle between the two sides 205, 207 can vary along the passage 110. The angle between the two sides 205, 207 can continuously increase, continuously decrease, stepwise increase, stepwise decrease, switch from increasing to decreasing or from decreasing to increasing, or any combination thereof.

In one or more embodiments, the sides 205, 207 can be joined together above the corner 210 by any suitably configured side 215. For example, the side 215 can be curved, straight, multiple sided, that is two or more straight sides, two or more curved sides, at least one straight side and at least one curved side, or any other combination. The side 215 can connect sides 205, 207 to provide the passage 110 having the one or more first grooves 115 disposed toward the corner 210 and an upper portion of the passage volume 220 disposed toward side 215. The sides 205, 207 can extend from the corner 210 the same length or the sides 205, 207 can extend from the corner 210 with different lengths. The cross-section of the passage 110 can be a substantially triangular-shaped region defined by the corner 210 and the sides 205, 207 connected to a side 215 that is curved. In at least one specific embodiment, as illustrated in FIG. 2, the cross-section of the passage 110 can have an "ice cream cone" shaped cross-section, where the first groove 115 can be referred to as the "cone" and the upper portion of the passage volume 220 can be referred to as the "ice cream" of an "ice cream cone." In one or more embodiments, the corner 210 can face outwardly from the central axis about which the passage 110 can be curved to provide the centrifugal flow path along the first groove 115.

Referring to FIGS. 1 and 2, any one or more sides 205, 207, 215 and any other surface, can be coated with one or more materials. In one or more embodiments, the side 215 and the one or more upper collector exit ports 145 can be coated with one or more hydrophobic materials and the sides 205, 207 and the one or more lower collector exit ports 140 can be coated with one or more hydrophilic materials. In one or more embodiments, the side 215 and the one or more upper collector exit ports 145 can be coated with one or more hydrophilic materials and the sides 205, 207 and the one or more lower collector exit ports lower 140 can be coated with one or more hydrophobic materials. In one or more embodiments, the side 215 and/or the sides 205, 207 and collector exit ports 140, 145 can be coated with one or more antifouling agents, corrosion inhibitors, oxidation inhibitors, other surface modifying coatings, or any combination thereof depending upon the MPS 100 system requirements.

Referring again to FIG. 1, the separator exit port 117 of the passage 110 can be oriented toward the bottom portion 130 of the internal volume 125 at any suitable angle. In one or more embodiments, the separator exit port 117 can be directed at an angle ranging from about 10° to about 170°, about 30° to about 150°, about 50° to about 130°, or from about 70° to about 110°. For example, the separator exit port 117 can be directed perpendicularly, that is 90°, toward the second groove 135 disposed along the bottom portion 130 of the collector 120.

In one or more embodiments, a cross-section of the collector 120 may be substantially as discussed and described above with reference to the "ice cream cone" shaped cross-section of the passage 110. The second groove 135 disposed in the bottom portion 130 can be the same or similar to the first groove 115 disposed within the passage 110. The bottom portion 130 of the collector 120 can be linear, as shown, or non-linear. In one or more embodiments, the cross-sectional area of the collector 120 can be larger in area than the cross-sectional area of the passage 110. For example, the cross-sectional area of the collector 120 can be about 3X or more, about 4X or more, about 5X or more, about 6X or more, about 7X or more, or about 8X or more than the cross-sectional area X of the passage 110.

In one or more embodiments, the second groove or "cone" 135 can include any suitable volume. The volume of the second groove 135 can be defined by the cross-sectional area of the second groove 135 times the length of the groove within the collector 120. For example, the volume of the second groove 135 can be about 0.5 liters ("L") or more, about 1 L or more, about 3 L or more, about 5 L or more, or about 7 L or more.

The first collector exit port 140 can be disposed about the bottom portion 130 of the collector 120 and the second collector exit port 145 can be disposed about an upper side 150 of the collector 120. The first collector exit port 140 can be at least partially disposed about the lower portion of the collector 120. Further, the first collector exit port 140 can be positioned along the length of the collector section 120 at any position. For example, the first collector exit port 140 can be positioned below the separator exit port 117 from the passage 110. In an embodiment, the second collector exit port 145 can be disposed through the upper side 150 (see FIG. 8). The second collector exit port 145 can be disposed toward the opposite end of the collector 120 than the separator exit port 117 is disposed. In one or more embodiments, the second collector exit port 145 can be flush or even with the side 215. In one or more embodiments, the second collector exit port 145 can extend at least partially into the internal volume 125 of the collector 120 to provide an exit port that is not flush or even with the side 215.

In one or more embodiments, each component of the MPS 100 can be made from any suitable material or combination of suitable materials. Suitable materials for the MPS 100 can include, but are not limited to polymers, metals, carbon fiber, resins, glasses, and the like. For example, suitable metals can include, but are not limited to titanium, zirconium, cobalt, nickel, silver, copper, palladium, gold, platinum, chromium, aluminum, stainless steel, or combinations or alloys thereof. Suitable polymers can include, but are not limited to, acrylics, polyethylenes, polypropylenes, polyurethanes, polytetrafluoroethylenes, polyvinylchlorides, polycarbonates, other thermoplastic resins or engineering resins, and the like.

In at least one specific embodiment, the separator 105 and the collector 120 can be made from two or more materials. In at least one specific embodiment the separator 105 and the collector 120 can be made from different materials. For example the side 215 can be made from a different material than the sides 205, 207 to provide different properties, for example corrosion resistance, surface energy interaction with different fluids, reduced susceptibility to bio-fouling, and the like.

Figure 3:
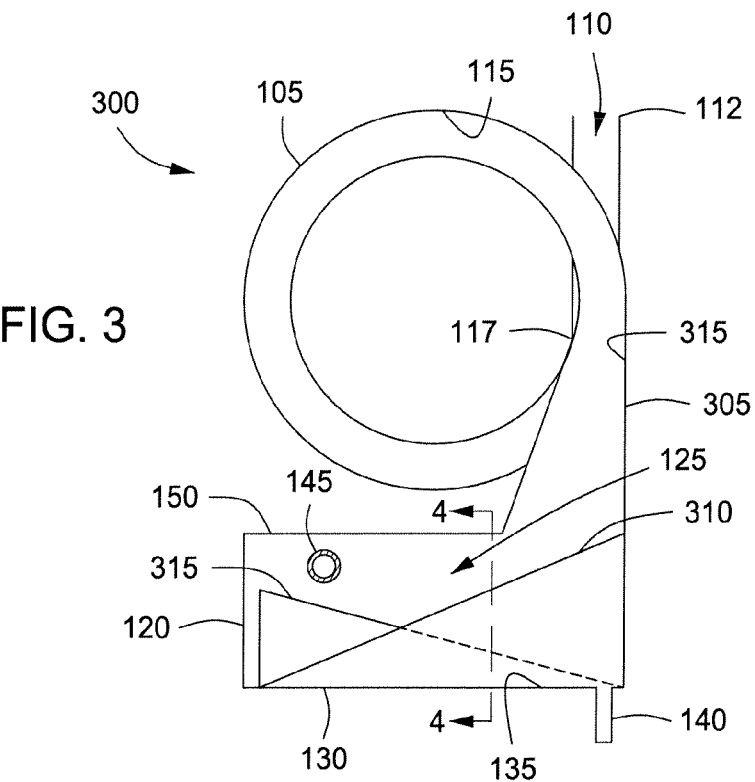
FIG. 3 depicts another schematic of an illustrative multi-phase separator according to one or more embodiments described.

FIG. 3 depicts another schematic of an illustrative multi-phase separator 300 according to one or more embodiments. The MPS 300 can include the separator 105, the collector 120, and the passage 110, which may be substantially as discussed and described above with reference to FIGS. 1 and 2. In one or more embodiments, the MPS 300 can further include a diffuser 305. The non-limiting embodiment shown in FIG. 3 further includes one or more vanes (two are shown) 310, 315 disposed in the collector 120. The diffuser 305 can be disposed between the separator exit port 117 of the passage 110 and the collector 120. The vanes 310, 315 can be at least partially disposed within the second groove 135 of the collector 120. In at least one specific embodiment, one or more vanes can be disposed along at least a portion of the length of the one or more first grooves 115 of the passage 110.

With continued reference to FIG. 3, the diffuser 305 can have an expanding cross-section from the passage 110 toward the collector 120. For example, the diffuser 305 can expand in cross-sectional area from the separator exit port 117 of the passage 110 to the collector 120. In one or more embodiments, the cross-section of the diffuser 305 can be the same as or different than the cross-section of the passage 110 discussed and described above in reference to FIG. 2. The diffuser 305 can include a third groove 315 that can be substantially the same as the one or more first and second grooves 115, 135 discussed and described above with reference to FIG. 2 and below with reference to FIG. 4. For example, the third groove 315 can include one or more vanes or the third groove 315 can be free of any vanes. As an example, the cross-sectional area of the diffuser 305 at the collector 120 can be about 2X, about 3X, about 4X, about 5X, about 6X, or about 7X or more than the cross-sectional area X at the separator exit port 117.

With continued reference to FIG. 3, in one or more embodiments, the one or more vanes 310, 315 can be of any suitable shape and can be disposed about at least a portion of the second groove 135. As specifically illustrated in FIGS. 3 and 5, in one or more embodiments, the vanes can be a thin triangular plate or sheet disposed within the second groove 135. In one or more embodiments, the vanes can be any polygonal shape, for example a simple polygon, a complex polygon, a convex polygon, a concave polygon, a regular polygon, an irregular polygon, parallelogram, non-parallelogram, or any combination thereof. In one or more embodiments, the vanes can be any non-polygonal shape, for example a circle, an ellipse, oval, or other shapes having one or more curves. In one or more embodiments, the vanes can include one or more straight sides and one or more curved sides.

Figure 4:
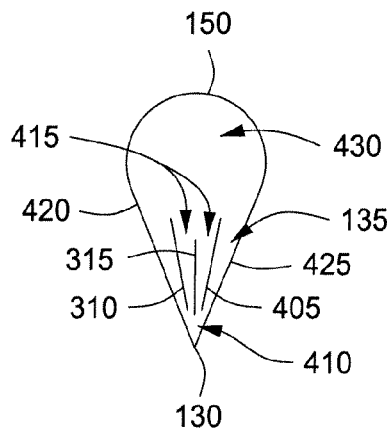
FIG. 4 depicts an illustrative cross-sectional view depicted in FIG. 3 along line 4-4 according to one or more embodiments described.

FIG. 4 depicts an illustrative cross-sectional view depicted in FIG. 3 along line 4-4, according to one or more embodiments. As shown, the second groove 135 can be defined by two sides or walls 420, 425 that can intersect to form a corner along the bottom portion 130. For simplicity and ease of description, embodiments of the cross-section of the collector 120 will be further described in the context of a cross-section that includes an intersection of two flat sides, however, any other suitable cross-section can be included in the collector 120. Other cross-sections can include, but are not limited to a parabola which can be defined at least in part by two sides curving together, a flat bottom which can be defined at least in part by two sides narrowing toward a flat surface, any other intersection of two or more surfaces, and the like.

In one or more embodiments, the angle between the two sides 420, 425 can be any suitable angle. In one or more embodiments, the angle between the two sides 420, 425 can range from a low of about 5°, about 10°, about 15°, or about 20° to a high of about 50°, about 65°, about 75°, or about 90°. For example, the angle between the two sides 420, 425 can be about 30°, about 35°, about 40°, or about 45°. In one or more embodiments, the angle between the two sides 420, 425 can vary along the collector 120. The angle between the two sides 420, 425 can continuously increase, continuously decrease, stepwise increase, stepwise decrease, switch from increasing to decreasing or from decreasing to increasing, or any combination thereof.

In one or more embodiments, the sides 420, 425 can be joined together above the bottom portion 130 by any suitably configured upper side 150. For example, the upper side 150 can be curved, straight, multiple sided, that is two or more straight sides, two or more curved sides, at least one straight side and at least one curved side, or any other combination. The upper side 150 can connect sides 420, 425 to provide the enclosed a collector having the one or more second grooves 135 disposed toward the bottom portion 130 and a flow path or upper volume 430 disposed toward the upper side 150. The sides 420, 425 can extend from the bottom portion 130 the same distance or the sides 420, 425 can extend from the bottom portion 130 with different lengths. The cross-section of the collector 120 can be a substantially triangular-shaped region defined by the bottom portion 130 and the sides 420, 425 connected to an upper side 150 that is curved. In at least one specific embodiment, as illustrated in FIG. 4, the cross-section of the collector 120 can have an "ice cream cone" shaped cross-section, where the one or more second grooves 135 can be referred to as the "cone" and the upper volume 430 of the collector can be referred to as the "ice cream" of an "ice cream cone."

Any one or more sides 420, 425, 150 can be coated with one or more materials. In one or more embodiments, the upper side 150 and the one or more second collector exit ports 145 can be coated with one or more hydrophobic materials and the sides 420, 425 and the one or more first collector exit ports 140 can be coated with one or more hydrophilic materials. In one or more embodiments, the upper side 150 and the one or more second collector exit ports 145 can be coated with one or more hydrophilic materials and the sides 420, 425 and the one or more first collector exit ports 140 can be coated with one or more hydrophobic materials. In one or more embodiments, the upper side 150 and/or the sides 420, 425 and collector exit ports 140, 145 can be coated with one or more antifouling agents, corrosion inhibitors, oxidation inhibitors, other surface modifying coatings, or any combination thereof depending upon the MPS 300 system requirements.

As shown in FIG. 4, the one or more vanes (three are shown 310, 315, 405) disposed within the second groove 135 can be positioned such that there can be a space 410 beneath the vanes 310, 315, 405. There can be a space 415 between the vanes 310, 315, 405 and the sides 420, 425. The vanes 310, 315, 405 can be attached to one or both ends of the collector 120 to provide the space 410. The spaces 410 and 415 can permit a fluid, not shown, to flow in the second groove 135 below and/or between the one or more vanes 310, 315, 405. In at least one specific embodiment, the first groove 115 of the passage 110 and/or the third groove 315 of the diffuser 305 can include one or more vanes. As shown in FIG. 4, the second groove 135 and an upper volume 430 of the collector 120 together provide the internal volume 125 of the collector 120, shown in FIG. 3.

Referring to FIGS. 1 and 3, in one or more embodiments, the one or more second collector exit ports 145 can be disposed on the collector 120 such that a flow path through the collector 120 requires at least one change in direction (at least one directional transition), for example one 90° turn from the separator exit port 117, for a fluid to exit the MPS. In one or more embodiments, the one or more second collector exit ports 145 can be disposed on the collector 120 such that a flow path through the collector 120 has at least two directional transitions for a fluid to exit the MPS. In one or more embodiments, the one or more collector exit ports 145 can be disposed on the upper side 150, such that two changes in direction or two directional transitions, for example two 90° turns from the separator exit port 117, are required for a fluid to exit the MPS 100. Additional changes in direction for a fluid exiting the separator exit port 117 can be accomplished by installing one or more plates along a portion of the upper volume 220, such that a fluid introduced to the collector 120 via separator exit port 117 is required to "zig zag" through a one or more turns before exiting the one or more second collector exit ports 145.

Figure 10:
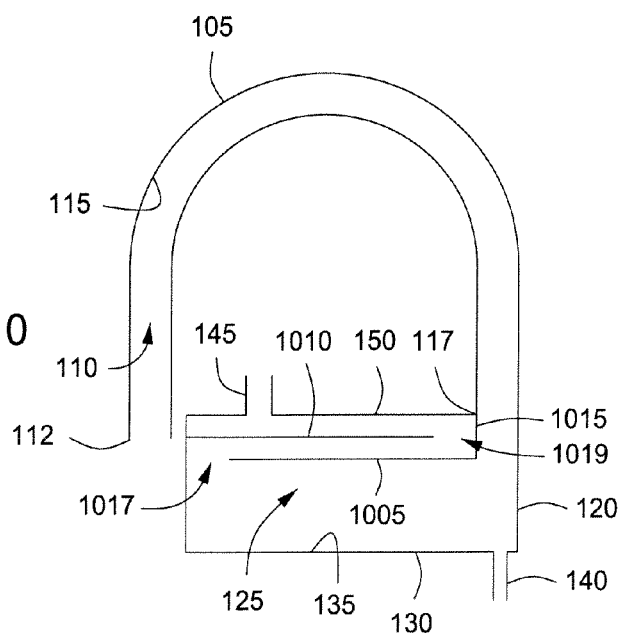
FIG. 10 depicts a schematic of an illustrative multi-phase separator according to one or more embodiments described.

FIG. 10 depicts a schematic of an illustrative multi-phase separator according to one or more embodiments. The example of FIG. 10 illustrates that adding one or more plates to a collector volume can increase the number of directional transitions for fluid flowing in the collector volume. As shown in FIG. 10, a first plate 1005 and a second plate 1010 are disposed about a portion of the length of the collector 120. The first plate 1005 extends from a passage extension wall 1015 connected to the separator exit port 117 of the passage 110 toward the left side of the collector 120. A first space 1017 can be provided between the left wall of the collector 120 and the left end of the first plate 1005 to allow for the passage of a fluid. In one or more embodiments, the second plate 1010 can be disposed above the first plate 1005, such that a passage can be provided between the first plate 1005 and the second plate 1010. The second plate 1010 can extend from left side of the collector toward the passage extension wall 1015, with a second space 1019 provided between the second plate 1010 and the passage extension wall 1015 to allow for the passage of a fluid. Additionally, the second plate 1010 can be disposed within the collector 120 below the upper side 150, such that a passage can be provided between the second plate 1010 and the upper side 150. The addition of the two plates 1005, 1010 provide a flow path that requires six directional transitions for a fluid to exit the collector 120 via the one or more second collector exit ports 145. While FIG. 10 illustrates two plates 1005, 1010, other embodiments may include fewer or more plates than are shown without departing from the scope of the disclosure. In one or more embodiments, a single plate can be disposed within the collector 120 to provide a flow path requiring four or more directional transitions for a fluid to exit the collector 120 via the one or more second collector exit ports 145. In one or more embodiments, or three or more plates can be disposed within the collector 120 to provide a flow path requiring eight or more directional transitions for a fluid to exit the collector 120 via the one or more second collector exit ports 145.

In one or more embodiments, the first and second plates 1005, 1010, and the passage extension wall 1015 can be made from any suitable material or combination of suitable materials. Suitable materials can include, but are not limited to polymers, metals, carbon fiber, resins, glasses, and the like. For example, suitable metals can include, but are not limited to titanium, zirconium, cobalt, nickel, silver, copper, palladium, gold, platinum, chromium, aluminum, stainless steel, or combinations or alloys thereof. Suitable polymers can include, but are not limited to, acrylics, polyethylenes, polypropylenes, polyurethanes, polytetrafluoroethylenes, polyvinylchlorides, polycarbonates, other thermoplastic resins or engineering resins, and the like.

In one or more embodiments, the first and second plates 1005, 1010, and the passage extension wall 1015 can be coated with one or more materials. Suitable coating materials can include, but are not limited to, one or more antifouling agents, corrosion inhibitors, oxidation inhibitors, hydrophilic materials, hydrophobic materials, other surface modifying coatings, or any combination thereof depending upon the MPS system requirements.

Figure 5:
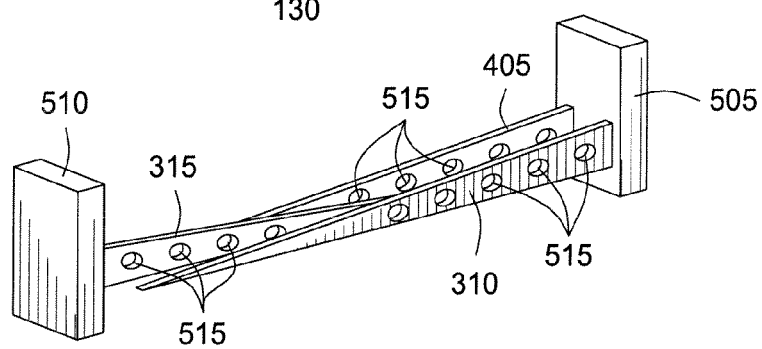
FIG. 5 depicts an isometric view of opposing vanes according to one or more embodiments described.

FIG. 5 depicts an isometric view of opposing vanes 315 and 310, 405 according to one or more embodiments. The one or more vanes 310, 315, 405 can be secured to collector ends 505, 510. The non-limiting example of FIG. 5 shows two vanes 310, 405 attached to the collector end 505 and a third vane 315 attached to the collector end 510 to provide opposing vanes. The collector ends 505, 510 can provide the side or end walls of the collector 120 (see FIGS. 1, 3 and 10). In one or more embodiments, the one or more vanes 310, 315, 405 can be secured to the collector ends 505, 510 by any suitable method, for example friction fit, welding, adhesives, screws, clamps, rivets, and the like. In one or more embodiments, the one or more vanes 310, 315, 405 and the collector ends 505, 510 can be integrally cast, machined, or otherwise formed as an integral unit. In one or more embodiments, the collector ends 505, 510 can have one or more grooves similar to the first groove 115 and/or the second groove 135 discussed and described above with reference to FIGS. 1-4.

In one or more embodiments, the vanes can include one or more apertures 515 disposed through the vanes. The apertures 515 can provide a flow path for a fluid between the vanes 310, 315, 405, increase the coalescence of a liquid, and/or facilitate removal of a liquid via the one or more first collector exit ports 140 (see FIGS. 1, 3 and 10). In one or more embodiments, the apertures 515 may be provided in addition to or in lieu of the space 410 (FIG. 4) beneath the one or more vanes 310, 315, 405. In one or more embodiments, if two or more vanes are disposed within the collector 120 one vane or multiple vanes can include one or more apertures 515. The one or more apertures 515 can be disposed along a portion of or the entire length of the associated vane. The apertures 515 can be any shape, such as polygonal, non-polygonal as shown or a combination thereof. In one or more embodiments, the cross-sectional area of the apertures 515 can range from a low of about 1 mm$^2$, about 3 mm$^2$, or about 5 mm$^2$ to a high of about 1 cm$^2$ or more, about 5 cm$^2$ or more, or about 10 cm$^2$ or more.

Referring to FIGS. 3, 4, and 5 the one or more vanes 310, 315, 405 can vary in height and density. As an example and as illustrated in FIG. 5, the two vanes 310, 405 can decrease in height as the vanes project toward the left side of the collector 120. The opposing vane 315 can decrease in height as the vane projects toward the right side of the collector 120. In one or more embodiments, the vanes 310, 315, 405 can be disposed within the second groove 135 only or the vanes can extend into the upper section toward the upper side 150 of the internal volume 125 above the second groove 135. The vanes 310, 315, 405 can be made from any suitable material, which can include, but is not limited to the material the MPS can be made from, which is discussed and described above. One or more surface modifiers can be coated on the vane or vanes 310, 315, 405 that can include, but are not limited to one or more antifouling agents, corrosion inhibitors, oxidation inhibitors, and other surface modifying coatings depending upon the MPS system requirements.

FIG. 6 depicts an operational view of an illustrative multiphase separator 600 according to one or more embodiments. The MPS 600 can be similar to the multi-phases separators discussed and described above with reference to FIGS. 1-5. A multiphase fluid can be introduced via the first end 112 to the passage 110 and the liquid phase of the fluid can be recovered via the one or more first collector exit ports 140 and the gas phase of the fluid can be recovered via the one or more second collector exit ports 145. In other words, the one or more first collector exit ports 140 may be capable of liquid transfer and the one or more second collector exit ports 145 may be capable of gas transfer. In one or more embodiments, the MPS 600 can separate a multiphase fluid into its liquid component via the one or more first collector exit ports 140 and its gas component via the one or more second collector exit ports 145 in a micro gravity environment (<0.1 g), a partial gravity environment (0.1<1 g), or a gravity environment ($\geq$1 g).

The fluid can include a gas and a liquid; a gas and a liquid having solids dissolved in the liquid; a gas, liquid having solids dissolved in the liquid, and solids mixture; a gas, liquid, and solid mixture, or any combination thereof. The liquid can be any liquid, for example water, fuel, urine, humidity condensate, space suit liquid, respiration, perspiration, shower water, shaving water, and other waste water to name a few. The liquid can be introduced to the MPS 600 using a carrier gas, for example oxygen, nitrogen, argon, helium, carbon dioxide, air such, as cabin air, or any combination thereof. The carrier gas can be pressurized or non-pressurized that is at environmental pressure. A carrier gas that includes, for example, cabin air can be on a spacecraft, a space station, a space vehicle/rover, a satellite, a missile, a telescope, a probe, or other structures deployed in space.

Figure 9:
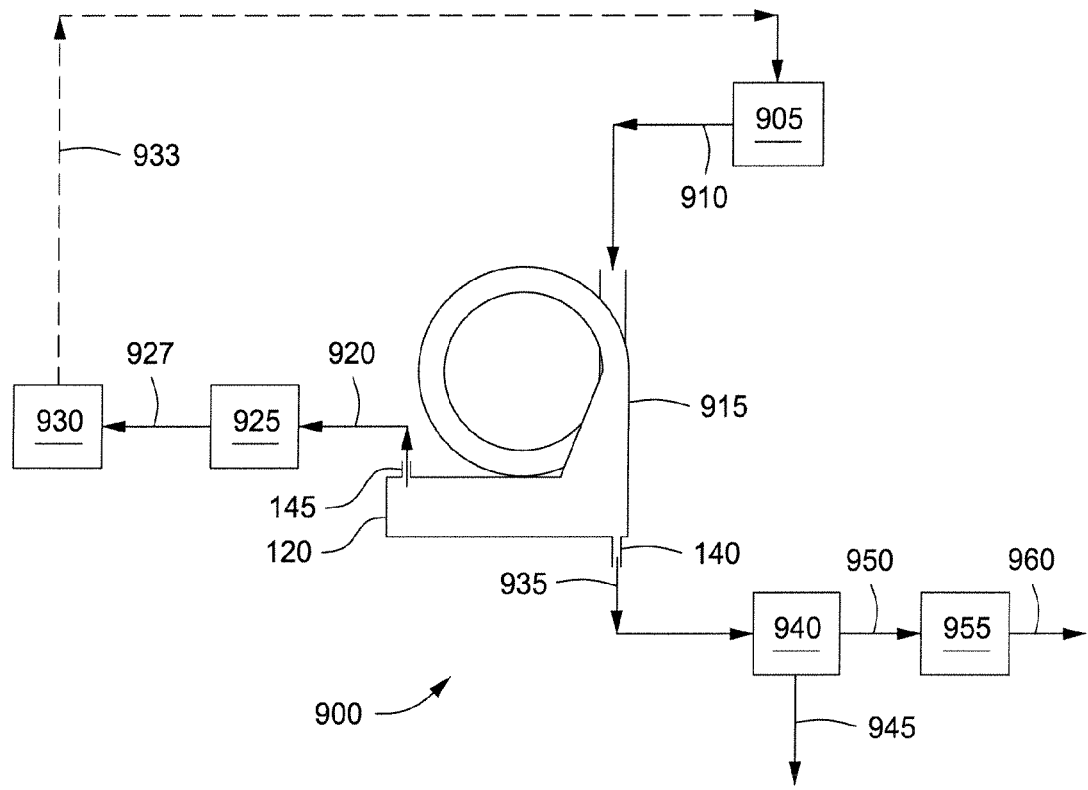
FIG. 9 depicts a schematic of an illustrative multi-phase separation system according to one or more embodiments described.

The motive force for introducing the fluid to the MPS 600 can be provided by or include one or more motive force devices 925, as illustrated in FIG. 9, positioned downstream and in fluid communication with at least one of the one or more second collector exit ports 145. Referring to FIGS. 6 and 9, the use of one or more motive force devices 925 can decrease the pressure within the MPS 600 relative to the outside environment, thereby pulling or drawing the multiphase fluid into the passage 110. In at least one specific embodiment, the motive force can be provided by or be included in a fluid introduction device 905 positioned upstream of the first end 112, which can increase the pressure within the MPS 600 relative to the outside environment by pushing or urging a multiphase fluid into the passage 110. Motive force devices 925 can include, but are not limited to, fans, pumps, pistons, non-pressurized or low pressurized containers, space vacuum, and the like.

With continued reference to FIG. 6, the fluid can be introduced to the MPS 600 at a gas-to-liquid (G:L) ratio of from about 0:1 to about 1000:1, or from about 25:1 to about 500:1, or from about 50:1 to about 200:1. For example, the fluid can be introduced to the MPS 600 at a gas-to-liquid ratio of about 75:1, about 100:1, about 150:1, or about 175:1. In one or more embodiments, the fluid can be introduced to the MPS 600 at a liquid-to-gas ratio (L:G) of from about 0:1 to about 1000:1, or from about 25:1 to about 500:1, or from about 50:1 to about 200:1. In one or more embodiments, the gas can be introduced to the MPS 600 at a rate ranging from a low of about 0 liters per minute ("L/min"), about 10 L/min, or about 20 L/min to a high of about 40 L/min, about 60 L/min, or about 80 L/min. In one or more embodiments, the liquid can be introduced to the MPS 600 at a rate ranging from a low of about 10 L/min, about 0.3 L/min, or about 0.5 L/min to a high of about 1 L/min, about 4 L/min, or about 8 L/min. In one or more embodiments, the gas and liquid can be introduced at a steady rate or a variable rate. In one or more embodiments, the gas can be introduced at a steady rate and the liquid can be introduced at a variable rate. In one or more embodiments, the gas can be introduced at a variable rate and the liquid can be introduced at a steady rate.

If only a gas or only a liquid is introduced to the MPS, the MPS would then function as either a gas or liquid transfer device that can direct the gas or the liquid. For example, a liquid without a gas can be introduced and transported in the MPS using capillary and/or inertial forces and stored within the collector 120 and/or recovered via the first collector exit port 140 without substantial motive force provided by gas.

The MPS 600 can separate a liquid from a gas in a fluid for liquids that exhibit known, unknown, and/or variable wetting properties. The liquid can be wetting (contact angle 9)0°, partially wetting (contact angles from 0°<θ<90°), non-wetting (contact angle θ>90°), variably wetting (contact angle hysteresis), or combinations thereof.

The multiphase fluid introduced via the first end 112 to the passage 110 may be at least partially separated in the separator 105 by flowing through a centrifugal flow path provided by a curved portion of the passage 110. In an embodiment, where the corner 210 of the first groove 115 faces outwardly in relation to the central axis about which the passage 110 is curved, the curved portion of the passage 110 can provide an effective centrifugal acceleration, such that liquid drops in the fluid can be directed toward the first groove 115 while gas can be directed toward the passage volume 220 (see FIGS. 1, 2, 3 and 10). The first groove 115 can provide a guide for the liquid such that a "guided rivulet flow" of liquid can be formed within the first groove and can flow along the passage 110 toward the collector 120. The first groove 115 can passively drive or move the liquid due to capillary forces. When a liquid is introduced to the first groove 115, the pressure drop across the fluid surface can drive the fluid along the passage 110 toward the collector 120. The gas flowing through the passage volume 220 can provide further motive force for urging the liquid along the first groove 115 in the "guided rivulet flow."

Depending on the wetting properties of the liquid in the fluid, the liquid can tend to adhere when impacting a dry surface in the passage 110, coalesce when impacting previously adhered liquid surfaces, or both. By directing the liquid to the first groove 115, in the absence of adequate capillary pumping due to poor wetting, the liquid can be driven downstream by the gas flow to the collector 120. In zero gravity or micro-gravity environments liquid drops will not always coalesce and instead can rebound off other liquid drops. Therefore, the length of the passage 110 and the number of turns or coils of the passage 110 can be designed such that the residence time and the centrifugal acceleration can be sufficient to coalesce the liquid and direct the liquid into the first groove 115. In one or more embodiments, the passage 110 can have a sufficient length in order to direct the liquid toward the first groove 115 prior to exiting the passage 110.

Once the liquid is directed into and contained in the first groove 115, the liquid can travel down the passage 110 via capillary forces and without the need for the centrifugal forces. Therefore, if a particular situation, such as space requirements or vehicle design, requires the separator 105 to be in one location and the collector 120 in another, the liquid can be directed into the first groove 115 of the passage 110, which can then straighten into a linear path or semi-linear path. The liquid may then flow toward the collector 120 positioned some distance away from the separator. The capillary forces and/or the motive force of the gas moving through the passage 110 can drive the liquid along the groove 115 toward the collector 120.

The fluid or the at least partially separated liquid and gas can be introduced from the separator exit port 117 into the collector 120 (see FIG. 1) or the liquid and gas can be introduced to the diffuser 305 (see FIGS. 3 and 6). The diffuser 305 can continue the guided rivulet flow of the liquid, while reducing the velocity of the gas. The expanding cross-section of the diffuser 305 can reduce the velocity of the gas without increasing or only minimally increasing the resistance of the liquid to continue to flow toward and ultimately into the collector 120.

The flowing gas along the passage 110 can urge the liquid toward and into the second groove 135 disposed along the bottom portion 130 of the collector 120. In addition to the flowing gas or in the absence of flowing gas the liquid's inertia can direct the liquid toward and into the second groove 135 of the collector 120. The forces provided by the flowing gas can improve the penetration of the liquid into the second groove 135 and/or into the vanes 310, 315.

Once the liquid exits the passage via the separator exit port 117 or the diffuser 305 and is urged or driven into the second groove 135 the liquid can be contained within the second groove 135 while the gas can exit the one or more second collector exit ports 145. The addition of the one or more vanes 310, 315, 405 can improve the retention of the liquid within the collector 120. For poorly wetting liquids the groove 135 and/or the vanes 310, 315 can serve as a capillary device by holding and containing the liquid in a single piece or mass. Varying the density, e.g. size, shape, number, thickness, and angles of the one or more vanes 310, 315 can provide increased liquid drop adhesion on the vane walls, liquid drop coalescence with previously adhered drops if already present, and capillary forces in the collector 120. The geometry of the one or more vanes 310, 315, for example decreasing interior vane angles in the direction of flow can provide a passive method for removing trapped gas out of the liquid as it moves downstream. Furthermore, the one or more vanes 310, 315 can provide a capillary pumping mechanism for moving liquids toward the one or more first exits ports 140.

The change in direction of the flow path or the one or more directional transitions for the gas within the collector 120 can be favorable for the gas to follow and unfavorable for the liquid to follow due to the liquid's greater mass/inertia. Two 90° turns are shown in FIGS. 1, 3, 6, 7, and 9 and six 90° turns are shown in FIG. 10. The one or more directional transitions to the flow path within the collector 120 are unfavorable for a liquid to follow and therefore, can reduce or eliminate the ability of the liquid to exit the collector 120 with the gas via the one or more second collector exit ports 145.

The one or more first collector exit ports 140 can be closed during fluid introduction and separation, open, or cycled between open and closed, thereby storing liquid when closed and removing liquid when open. As such, liquid collected or as it is being collected in the collector 120 can be removed at a steady rate or a variable rate. The removal of the liquid can be maintained such that all the liquid is not removed from the collector 120 while the separated gas is flowing through the MPS 600, which can prevent or reduce removal of gas along with the liquid.

In one or more embodiments, coating the sides of the first and second grooves 115, 135 and/or the one or more vanes 310, 315, 405 with one or more coatings exhibiting certain characteristics can improve the separation of the fluid. For example, coating the side 215 with a hydrophobic material and the sides 205, 207 with a hydrophilic material can further induce separation because the liquid will be further attracted toward the hydrophilic material. In another example, coating the sides 205, 207, 215 and the vanes 310, 315, 405 for example, with an antifouling agent can reduce the build up of a bio-film that can form over time when separating, for example, cabin air and urine.

In one or more embodiments, the materials of the MPS 600 can also influence how the liquid flows through the MPS 600. For example, the surfaces within the MPS 600 can be made from or include hydrophobic and/or hydrophilic materials to improve fluid separation. Surface roughness and other small scale imperfections on/in the surfaces of, for example the diffuser 305, can cause pinning effects, which can cause the liquid to form globules and thereby restrict the liquid's ability to flow into the collector 120. In one or more embodiments, an MPS according to the present disclosure can be constructed using materials that have reduced surface imperfections, which can reduce or eliminate pinning effects on a liquid flowing in the MPS. In at least one particular embodiment, the surfaces within the MPS 600 can be made from titanium, which has a good corrosion resistance and favorable wetting characteristics for liquids including urine. Titanium can also be polished to a smooth surface, which can reduce pinning effects. For example, titanium can be polished to a smooth surface having a surface roughness of less than about 5 microns, less than about 1 micron, less than about 0.5 microns, or less than about 0.2 microns.

FIG. 6 illustrates an MPS 600 separating a fluid mixture of gas and a liquid having a wetting angle ranging from about 50° to about 90°. As shown, the fluid enters the MPS 600 via the inlet port 112 as a two phase mixture of one or more gases and one or more liquids. As the mixture flows through the passage 110 the liquid becomes entrained in the first groove 115 and flows along the passage 110 in a "guided rivulet flow". The varying vane density, for example the height of the vanes 310, 315 can vary along the liquid flow path to provide a favorable capillary pressure gradient for poorly wetting liquids, greater stability for liquids trapped within the second groove 135/vanes 310, 315, and a passive mechanism to force entrained gas bubbles out of the liquid and into the gas flowing in the upper area of the internal volume 125 toward the one or more second collector exit ports 145. The motive gas forces and the capillary forces can improve containment of the liquid within the second groove 135.

FIG. 7 depicts another operational view of an illustrative multi-phase separator (MPS 700), according to one or more embodiments. In one or more embodiments, the MPS 700 can be the same as or similar to the multi-phase separators discussed and described above with reference to FIGS. 1-6. As shown, FIG. 7 illustrates an MPS 700 for separating a mixture of a gas and a highly wetting liquid having a wetting angle of less than about 45°. For highly wetting liquids coalescence can be inhibited as the liquid tends to skip, roll, or slide across the liquid films, particularly in the presence of surface contamination. As such, highly wetting liquids tend to lead to liquid thin films on nearly all, if not all interior surfaces. These liquid thin films can be driven toward the one or more second collector exit ports 145 due to the gas flow. The one or more second collector exit ports 145 can be designed in a manner that can reduce or prevent liquid exiting with the gas. For example, the one or more second collector exit ports 145 can be designed to pin the advancing thin films in a manner that urges the liquid into recirculation within the collector 120 rather than being removed with the gas through the one or more second collector exit ports 145.

Figure 8:
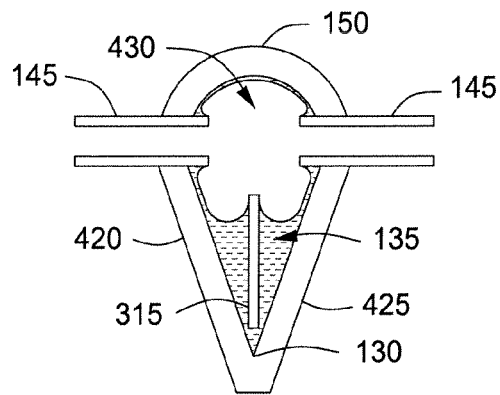
FIG. 8 depicts an illustrative cross-sectional view depicted in FIG. 7 along line 8-8 according to one or more embodiments described.

In one or more embodiments, the one or more second collector exit ports 145 can be disposed on the collector 120 such that a portion of the one or more second collector exit ports 145 extend into the internal volume 125 of the collector 120. FIG. 8 depicts an illustrative cross-sectional view depicted in FIG. 7 along line 8-8 according to one or more embodiments. As shown, the liquid films can flow to the edge or interface of the one or more second collector exit ports 145 that can extend into the internal volume 125 of the collector 120 to pin the liquid. More liquid can be urged to this interface whereupon the liquid can form a significant capillary connection with the liquid contained within the second groove 135 and as shown vane 315, which can then move the liquid away from the second collector exit ports 145 and into the second groove 135 with the contained liquid. Provided the second groove 135 is not saturated with liquid and continuous gas flow is maintained the highly wetting liquid can continue to re-circulate near the one or more second collector exit ports 145 rather than being carried out along with the exiting gas.

FIG. 9 depicts a schematic of an illustrative multi-phase separation system 900 according to one or more embodiments. The MPS system 900 can include a fluid introduction device 905, a MPS 915, a motive force device 925, a separated gas collection system 930, a liquid collection system 940 and a liquid purification system 955. The MPS 915 can be substantially as the multi-phase separators discussed and described above with reference to FIGS. 1-8 and 10.

The fluid introduction device 905 can be any suitable system, device, or combination of systems and/or devices that can provide a multiphase mixture of one or more gases and one or more liquids requiring separation into a gas and a liquid. For example, the fluid introduction device 905 can be a waste management device. Other devices that can provide a fluid requiring separation can include, but are not limited to, fuel cells, fuel tanks, space vehicles, aircraft, for example cabin air to be dehumidified, and the like. In one non-limiting embodiment, a gas, such as cabin air in a spacecraft or aircraft and a liquid such as urine from the fluid introduction device 905 can be introduced via line 910 to the MPS 915. The MPS 915 can separate the cabin air (i.e. gas) from the urine (i.e. liquid) to provide separated air via gas line 920 and separated liquid via liquid line 935, as discussed and described above with reference to FIGS. 1-8.

In one or more embodiments, the separated air via air line 920 can flow through or otherwise past the optional motive force device 925 to the separated gas collection system 930. The motive force device 925 can include any system, device, or combination of systems and/or devices suitable for introducing a motive force to the MPS 915. The motive force device 925 can include, but is not limited to, fans, pumps, pistons, non-pressurized or low pressurized containers, space vacuum, and the like, as discussed and described above with reference to FIG. 6. Should the motive force device 925 be eliminated, the separated gas can be introduced via line 920 directly to the separated gas collection system 930.

In one or more embodiments, the separated air can be introduced to the separated gas collection system 925, which can include a filter to remove at least a portion of any undesirable vapors. Undesirable vapors can include any organic, inorganic, and/or bio-inorganic compounds, for example ammonia that are separated from the fluid via the one or more second collector exit ports 145. The filter can be or include any suitable type of filter or filtering media, such as activated carbon, molecular sieves, and the like. In one or more embodiments, the air can be recycled to the fluid introduction device 905 via line 933, thereby recycling the air through the cabin back to the first end 112 of the passage 110.

In one or more embodiments, the liquid recovered via liquid line 935 can be introduced to the liquid collection system 940. The liquid collection system 940 can include any system, device, or combination of systems and/or devices suitable for containing and/or processing the separated liquid. In one or more embodiments, the liquid collection system 940 can be a holding tank or any other device suitable for storing liquids. In one or more embodiments, the liquid can be vented via line 945 outside the structure and into the environment, for example space if the MPS system 900 is placed aboard a space vehicle or satellite. In one or more embodiments, the liquid can be stored in the liquid collection system 940 for a permanent or temporary time. The liquid stored in the liquid collection system 940 can be discarded or further treated as desired.

In one or more embodiments, the liquid can be introduced via purification inlet line 950 to the liquid purification system 955. The liquid purification system 955 can include any system, device, or combination of systems and/or devices suitable for purifying a waste liquid, including urine, perspiration, respiration, shower water, shaving water, or combinations thereof. The liquid purification system 955 can include, but is not limited to one or more physical systems, chemical systems, or combinations thereof, both of which are well known in the art. In one particular embodiment the liquid can be distilled to remove at least a portion of any volatile components and to help prevent microbial growth. Filtration, temperature sterilization, biological absorption, ultraviolet light, photocatalytic oxidation, and/or any other suitable technique to purify a liquid can be used. Purified liquid via purification outlet line 960 can be recovered from the liquid purification system 955.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicants' right to claim disclosed, but not yet literally claimed subject matter by way of one or more further applications including those filed pursuant to the laws of the United States and/or international treaty.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

What is claimed is:

1. An apparatus for separating a fluid, comprising:
a separator; and
a collector having an internal volume defined at least in part by one or more surfaces narrowing toward a bottom portion of the internal volume, wherein the separator includes a separator exit port oriented toward the bottom portion of the internal volume, wherein the collector includes at least one collector exit port, and wherein the at least one collector exit port comprises a first collector exit port and a second collector exit port, the first collector exit port being a liquid exit port and the second collector exit port being a gas exit port.

2. An apparatus for separating a fluid, comprising:
a separator;
a collector having an internal volume defined at least in part by one or more surfaces narrowing toward a bottom portion of the internal volume, wherein the separator includes a separator exit port oriented toward the bottom portion of the internal volume; and
at least one vane disposed within the internal volume.

3. The apparatus of claim 2, wherein the at least one vane comprises one or more apertures disposed therethrough.

4. The apparatus of claim 2, wherein a hydrophobic, a hydrophilic, an antifouling agent, a corrosion inhibitor, an oxidation inhibitor, or combinations thereof are at least partially disposed on the surface of at least one of the passage, the collector, and the vane.

5. The apparatus of claim 2, wherein the separator comprises a passage that follows a non-linear path or a combination of linear and non-linear paths, and wherein at least a portion of the non-linear path or the combination of linear and non-linear paths is helically curved, spirally curved, or both.

6. The apparatus of claim 2, wherein the separator comprises a passage that follows a linear path, a non-linear path or a combination of linear and non-linear paths, and wherein the passage includes a first section and a second section, wherein the first section comprises a first cross-sectional area, and wherein the second section expands from the first cross-sectional area to a second cross-sectional area.

7. The apparatus of claim 2, wherein the bottom portion of the internal volume includes one or more of a corner, a curved surface and a flat surface.

8. An apparatus for separating a fluid, comprising:
a separator; and
a collector having an internal volume that receives a fluid expelled from the separator into a flow path in the collector, the flow path having at least two directional transitions within the collector.

9. The apparatus of claim 8, wherein the collector includes one or more plates disposed in the internal volume, the one or more plates providing at least a one of the at least two directional transitions.

10. The apparatus of claim 8, wherein the collector includes a first collector exit port and a second collector exit port, the first collector exit port and the second collector exit port being disposed to provide at least a one of the at least two directional transitions.

11. The apparatus of claim 8, further comprising at least one vane disposed within the internal volume.

12. The apparatus of claim 11, wherein the at least one vane comprises one or more apertures disposed therethrough.

13. The apparatus of claim 8, wherein the separator has a passage that includes a first section and a second section, wherein the first section comprises a first cross-sectional area, and wherein the second section expands from the first cross-sectional area to a second cross-sectional area.

14. The apparatus of claim 8, wherein the internal volume comprises a bottom portion, the bottom portion including one or more of a corner, a curved surface and a flat surface.

15. A method for separating a fluid comprising:
introducing the fluid to a separator;
at least partially separating the fluid into a gas and a liquid by flowing the fluid through the separator; and
expelling the separated fluid from the separator into a collector,
wherein the liquid is manipulated within the collector at least in part by at least one of a momentum of the liquid, a capillary force, and a motive force of the gas.

16. The method of claim 15, wherein the separator comprises a passage that follows a linear path, a non-linear path or a combination of linear and non-linear paths.

17. The method of claim 15, further comprising further separating the gas from the fluid by changing a flow path direction at least twice.

18. The method of claim 15, further comprising removing the liquid from the collector through a first collector exit port.

19. The method of claim 15, wherein a gas to liquid ratio ranges from about 1:1 to about 500:1.

20. A system for separating a fluid comprising:
a fluid introduction device;
a multi-phase separator comprising:
a separator in fluid communication with the fluid introduction device; and
a collector having an internal volume defined at least in part by one or more surfaces narrowing toward a bottom portion of the internal volume, wherein the separator includes a separator exit port oriented toward the bottom portion of the internal volume;
a gas collection system in fluid communication with a collector gas outlet; and
a liquid collection system in fluid communication with a collector liquid outlet.

21. The system of claim 20, wherein a motive force device is disposed between at least one of the collector gas outlet and the gas collection system, the fluid introduction device and the separator, and the gas collection system and the fluid introduction device.

22. The system of claim 20, further comprising a liquid purification system in fluid communication with the liquid collection system.

23. The system of claim 20, further comprising at least one vane disposed within the internal volume.

24. The system of claim 20, wherein the separator comprises a passage that includes a groove.

25. The system of claim 24, wherein the passage includes a first section and a second section, wherein the first section comprises a first cross-sectional area, and wherein the second section expands from the first cross-sectional area to a second cross-sectional area.

26. The system of claim 20, wherein the separator comprises a passage that follows a linear path, a non-linear path or a combination of linear and non-linear paths.

27. The system of claim 20, wherein the separator comprises a passage that follows a path that is at least partially helically curved, spirally curved, or both.

28. The system of claim 20, wherein the bottom portion of the internal volume includes one or more of a corner, a curved surface and a flat surface.

* * * * *